US012146977B2

(12) United States Patent
Baur

(10) Patent No.: US 12,146,977 B2
(45) Date of Patent: Nov. 19, 2024

(54) RADAR MODULE HAVING A TWIN FIN

(71) Applicant: VEGA Grieshaber KG, Wolfach (DE)

(72) Inventor: Roland Baur, Koenigsfeld (DE)

(73) Assignee: VEGA Grieshaber KG, Wolfach (DE)

( * ) Notice: Subject to any disclaimer, the term of this patent is extended or adjusted under 35 U.S.C. 154(b) by 416 days.

(21) Appl. No.: 17/431,536

(22) PCT Filed: Mar. 23, 2020

(86) PCT No.: PCT/EP2020/057990
§ 371 (c)(1),
(2) Date: Aug. 17, 2021

(87) PCT Pub. No.: WO2020/200882
PCT Pub. Date: Oct. 8, 2020

(65) Prior Publication Data
US 2022/0120846 A1    Apr. 21, 2022

(30) Foreign Application Priority Data

Apr. 2, 2019    (DE) ..................... 10 2019 204 671.1

(51) Int. Cl.
*G01S 7/03*    (2006.01)
*G01S 7/02*    (2006.01)
*H01P 5/107*    (2006.01)
*H01Q 13/02*    (2006.01)
*G01F 23/284*    (2006.01)
*H01Q 1/22*    (2006.01)

(52) U.S. Cl.
CPC ............... *G01S 7/03* (2013.01); *G01S 7/028* (2021.05); *H01P 5/107* (2013.01); *H01Q 13/02* (2013.01); *G01F 23/284* (2013.01); *H01Q 1/225* (2013.01)

(58) Field of Classification Search
CPC . G01S 7/03; G01S 7/028; H01P 5/107; H01Q 13/02; H01Q 1/225; G01F 23/284
See application file for complete search history.

(56) References Cited

U.S. PATENT DOCUMENTS

| 5,382,959 A | 1/1995 | Pett |
| 5,434,581 A | 7/1995 | Raguenet |
| 5,929,728 A | 7/1999 | Barnett |
| 7,075,480 B2 | 7/2006 | Fehrenbach |

(Continued)

FOREIGN PATENT DOCUMENTS

| DE | 10 2014 109 120 A1 | 12/2015 |
| DE | 10 2015 119 690 A1 | 5/2017 |

(Continued)

OTHER PUBLICATIONS

European Office Action issued on Apr. 3, 2023 in European Patent Application No. 20 713 615.1, 6 pages.

(Continued)

*Primary Examiner* — Peter M Bythrow
*Assistant Examiner* — Nazra Nur Waheed
(74) *Attorney, Agent, or Firm* — Oblon, McClelland, Maier & Neustadt, L.L.P.

(57) ABSTRACT

A radar module configured for plant monitoring is provided, including a microwave chip having a radar signal source configured to generate a radar signal having a frequency greater than 75 GHz, and a coupler, which is connected to the radar signal source.

9 Claims, 2 Drawing Sheets

(56) References Cited

U.S. PATENT DOCUMENTS

| | | |
|---|---|---|
| 7,692,588 B2 | 4/2010 | Beer |
| 7,752,911 B2 | 7/2010 | Schultheiss |
| 9,368,881 B2 | 6/2016 | Lee et al. |
| 9,488,719 B2 | 11/2016 | Schmalenberg |
| 9,496,610 B2 | 11/2016 | Blech |
| 10,103,447 B2 | 10/2018 | Tong |
| 10,811,373 B2 | 10/2020 | Zaman |
| 10,998,279 B2 | 5/2021 | Tschumakow |
| 11,408,974 B2 | 8/2022 | Mayer |
| 2004/0004576 A1 | 1/2004 | Anderson |
| 2005/0225480 A1 | 10/2005 | Fehrenbach |
| 2007/0026567 A1 | 2/2007 | Beer |
| 2007/0109178 A1 | 5/2007 | Schultheiss |
| 2008/0287085 A1 | 11/2008 | Forstner et al. |
| 2013/0293436 A1 | 11/2013 | Blech |
| 2015/0346322 A1 | 12/2015 | Schmalenberg |
| 2015/0364830 A1 | 12/2015 | Tong |
| 2015/0377682 A1 | 12/2015 | Gerding et al. |
| 2016/0223669 A1* | 8/2016 | Assefzadeh ............ G01S 7/411 |
| 2016/0301125 A1 | 10/2016 | Kim et al. |
| 2017/0208742 A1* | 7/2017 | Ingibergsson ......... A01D 75/00 |
| 2017/0324135 A1* | 11/2017 | Blech ...................... H01Q 1/38 |
| 2018/0287264 A1 | 10/2018 | Waelde |
| 2018/0375218 A1 | 12/2018 | Kamo et al. |
| 2019/0063983 A1 | 2/2019 | Schultheiss et al. |
| 2019/0067780 A1 | 2/2019 | Kirino et al. |
| 2020/0043875 A1 | 2/2020 | Zaman |
| 2020/0066661 A1 | 2/2020 | Tschumakow |
| 2020/0217922 A1 | 7/2020 | Mayer |
| 2020/0249067 A1 | 8/2020 | Mayer et al. |

FOREIGN PATENT DOCUMENTS

| | | | |
|---|---|---|---|
| DE | 10 2017 112 894 A1 | 12/2018 | |
| EP | 1 357 395 A1 | 10/2003 | |
| EP | 2 963 440 A1 | 1/2016 | |
| EP | 3 450 931 A1 | 3/2019 | |
| JP | 7-193423 A | 7/1995 | |
| RU | 2 556 746 C2 | 7/2015 | |
| RU | 2 564 453 C1 | 10/2015 | |
| RU | 2 571 455 C2 | 12/2015 | |
| WO | WO 90/13927 A1 | 11/1990 | |
| WO | WO 2010/130293 A1 | 11/2010 | |
| WO | WO-2016202394 A1 * | 12/2016 | ............ G01B 15/04 |
| WO | WO 2018/014951 A1 | 1/2018 | |

OTHER PUBLICATIONS

International Search Report issued on May 11, 2020 in PCT/EP2020/057990 filed on Mar. 23, 2020, 2 pages.

International Search Report and Written Opinion issued May 11, 2020 in PCT/EP2020/057990, 13 pages.

German Office Action Issued Mar. 2, 2020 in German Patent Application No. 10 2019 204 671.1, 6 pages.

International Preliminary Report on Patentability and Written Opinion issued Oct. 14, 2021 In PCT/EP2020/057990 (submitting English translation only), 9 pages.

Combined Russian Office Action and Search Report issued Apr. 22, 2022, in corresponding Russian Patent Application No. 2021122556/28(047128) (with English Translation of Category of Cited Documents) 9 pages.

Office Action mailed on Feb. 6, 2024 in U.S. Appl. No. 17/440,919, filed Sep. 20, 2021, total 18 pages.

* cited by examiner

RADAR MODULE HAVING A TWIN FIN

REFERENCE TO RELATED APPLICATIONS

This application claims priority to German Patent Application No. 10 2019 204 671.1, filed Apr. 2, 2019, which is incorporated herein by reference in its entirety.

FIELD OF INVENTION

The invention relates to radar measurement technology for plant monitoring and process automation. In particular, the invention relates to a radar module for plant monitoring, a radar measuring device with such a radar module and the use of a radar module for level measurement, level limit measurement, logistics automation or manufacturing automation.

BACKGROUND

Radar measuring instruments are used for process automation, in particular for monitoring plants, for example in the field of level measurement, point level measurement or object detection.

The radar signals to be emitted are generated by a radar module with a radar signal source and coupled into a waveguide or antenna, from which the radar signals are then emitted in the direction of the object or product to be monitored.

Common designs of a waveguide coupling for this purpose have a metallic pin, a fin, a patch antenna or a similar structure. Usually, the microwave signal is connected by means of a bond connection with circuit parts (for example microstrip structures) on a carrier plate.

Such radar measuring devices can be designed in particular for W-band or K-band frequencies.

SUMMARY

It is an object of the invention to provide an alternative radar module suitable for plant monitoring.

This object is solved by the subject-matter of the independent patent claims. Further embodiments of the invention result from the subclaims and the following description of embodiments.

A first aspect of the invention relates to a radar module, configured for plant monitoring, comprising a microwave chip. The microwave chip comprises a radar signal source configured to generate a radar signal having a frequency greater than 75 GHz. Also, it has a coupler, which may also be referred to as a coupling element hereinafter, which is connected to the radar signal source.

The system monitoring may, for example, be a level or limit level measurement. The radar module may also be set up to monitor a hazardous area of a machine, to detect or even recognize objects, for example as part of hazardous area monitoring, or to detect and count objects on conveyor belts or to determine the mass flow of a bulk material on a conveyor belt.

The term automation technology may be understood as a subfield of technology that includes measures for the operation of machines and plants without the involvement of humans. One goal of the related plant monitoring and process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subfield of automation technology relates to logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another subfield of automation technology relates to factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the participation of humans. The sensors used in this process and the specific requirements with regard to measuring accuracy when detecting the position and size of an object are comparable to those in the previous example of logistics automation.

The use at high frequencies reduces the overall dimensions of the antenna as well as the coupler and the waveguide or antenna coupler, of which the coupler is a component. Thus, all components of the radar signal coupling can be integrated directly on the microwave chip.

The coupling of the radar signals generated by the radar signal source of the microwave chip into the waveguide or directly into an antenna is performed directly from the microwave chip. In particular, the radar signal source is arranged to generate a radar signal of a frequency above 75 GHz, or above 150 GHz, alternatively above 200 GHz, and in particular above 240 GHz or above.

According to an embodiment, the coupler has two fins which are arranged opposite each other and have, for example, mirror symmetry with respect to each other. The two fins convert the transmitted signals generated by the radar signal source into electromagnetic waves, which then propagate in the waveguide or the antenna horn. The connection between the radar signal source and the fins is also made in the microwave chip, so that interfering transitions from the radar signal source (RF generator) to a line and from the line to the respective fin are largely avoided, thus reducing interfering reflections.

According to an embodiment, the two fins are arranged to radiate a symmetrical radar signal.

To improve the coupling properties, one or more stages may be provided in the coupling section.

According to another embodiment, the radar module has a frame that encloses the two fins, so that the frame protects the two fins from external mechanical effects.

The frame is used for connection to a waveguide or directly to an antenna. Inside and around the frame, a dielectric may be provided which is part of the microwave chip. This is, for example, the top layer of the chip.

According to another embodiment, the two fins are surrounded by a cavity, which may also be referred to as a resonant cavity, that is at least partially filled with a dielectric.

According to another embodiment, the cavity is filled with atmospheric gas.

According to a further embodiment, the coupler is a coupler pin or patch antenna.

According to another embodiment, the coupler and the radar signal source are interconnected via a common substrate. The substrate is a layer of the microwave chip. The signal connection between the radar signal source and the coupler can be set up with as little attenuation as possible, so that the sensitivity of the radar module is affected as little as possible. Since no bonding wires are provided to connect the coupler to the radar signal source, variations in the length and placement of the bonding wires cannot negatively affect the performance of the radar module.

According to a further embodiment, the radar module comprises a waveguide and/or an antenna. The coupler is arranged to couple the radar signal into the waveguide and/or the antenna, wherein the waveguide is arranged to forward the coupled radar signal. The antenna is arranged to radiate the coupled radar signal and to receive the echo again.

According to a further embodiment, the antenna is a horn antenna, optionally with a connector in the form of a waveguide.

According to another embodiment, the radar module is designed to generate a radar signal with a transmission frequency of more than 200 GHz.

According to a further embodiment, the diameter of the resonance chamber is less than 1.5 mm.

Another aspect relates to a radar measurement device comprising a radar module described above and below.

Another aspect relates to the use of a radar module described above and below for level measurement, point level measurement, logistics automation or manufacturing automation.

In the following, embodiments are described with reference to the figures. The illustrations in the figures are schematic and not to scale. If the same reference signs are used in the following description of the figures, these designate the same or similar elements.

DETAILED DESCRIPTION OF EMBODIMENTS

Figure 1:
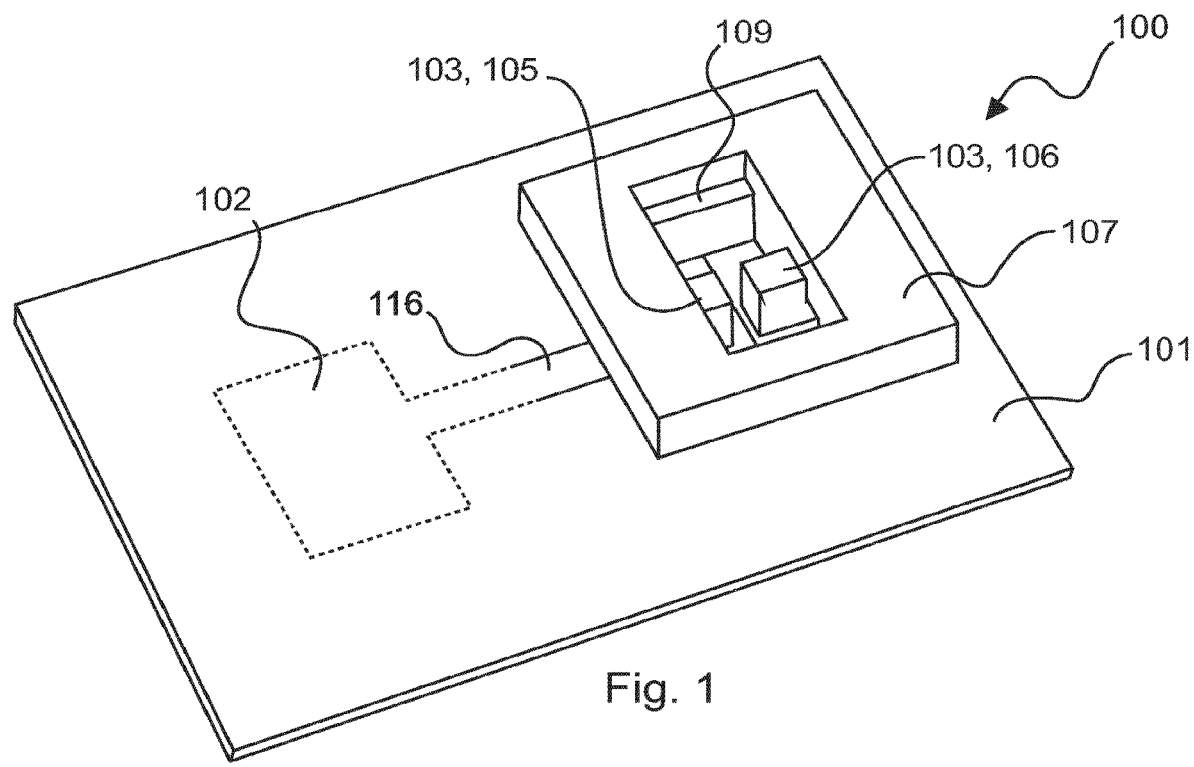
FIG. 1 shows a radar module according to an embodiment.

FIG. 1 shows a small section of a radar module 100 of a radar measuring device according to an embodiment. The radar module is used in the field of process automation, in particular for plant monitoring.

It has a microwave chip 101 on or in which a radar signal source 102 is formed. A coupler 103 is provided, for example in the form of two fins 105, 106, which are arranged opposite each other. The radar signal source is connected to the radar signal source 102 by one of the two fins 105 via the electrical connection 116.

The chip itself forms a resonant cavity, which is formed by a metallic frame 107 and in whose cavity the coupler 103 is located. The frame is used to connect the coupler to a waveguide or directly to an antenna.

The frame 107 and the coupler 103/105 are at least substantially made of metal and are, for example, at least partially embedded in a dielectric layer of the microwave chip 101. The dielectric layer may extend to approximately the height of the end faces of the coupler 103 or beyond, such that the coupler 103 is fully embedded in the dielectric layer.

The cross-section of the resonance chamber can be rectangular with a width greater than its depth, for example approximately twice as large.

Steps 109, 110 can be provided on the two narrower sides of the resonance chamber (cf. in particular FIG. 2), by means of which the coupling properties can be improved.

Figure 2:
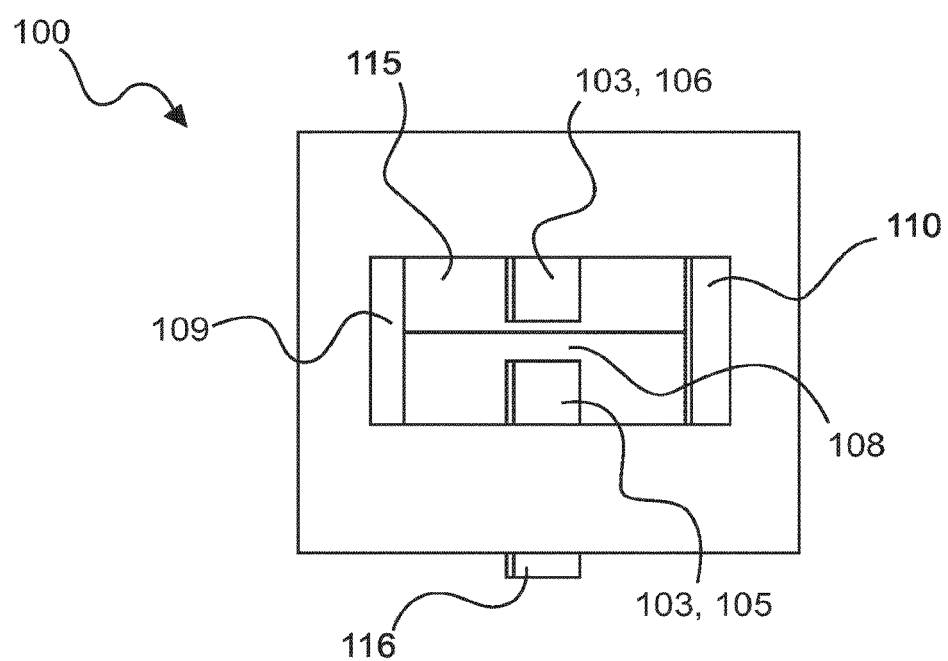
FIG. 2 shows a top view of the radar module of FIG. 1.

FIG. 2 shows a top view of the radar module of FIG. 1, with the second fin 106 located on a ground plane 115 that is conductively connected to the frame 107.

Between the oppositely disposed fins 105, 106 is a cavity 108 which may be at least partially filled with the dielectric.

Figure 3:
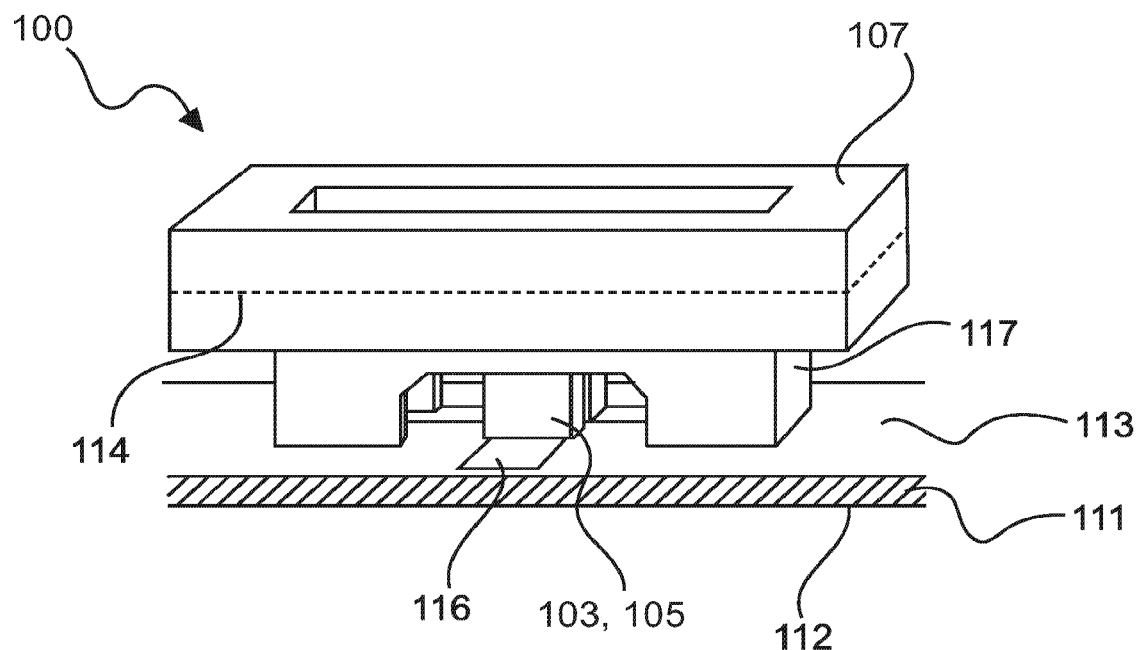
FIG. 3 shows a perspective view of a radar module according to an embodiment.

FIG. 3 shows another embodiment of the radar module 100 in which the base of the frame 107 is made narrower than the upper portion of the frame 107. In the lower portion, recesses are provided on opposite, longer sides of the frame. The electrical connection 116 to the first fin 105 passes through one of these recesses.

FIG. 3 shows three layers or plies of the microwave chip 101. Reference numeral 111 indicates a dielectric layer below which and above which are respectively a metal layer 112, 113. Above the metal layer 113, another dielectric layer may be provided, formed, for example, up to the dashed line 114 so that the frame 107 protrudes therefrom.

The continuing waveguide or directly the antenna is connected to this frame 107.

Due to the high frequencies of the radar signal (greater than 75 GHz), the mechanical design of the double fin becomes so small that it can be easily integrated into the microwave chip.

The radar signal is fed into the waveguide or antenna via the resonance chamber 108 with the aid of the two fins 105, 106 arranged mirror-symmetrically opposite each other. As a result, the electromagnetic wave is released symmetrically and unabsorbed into the waveguide or antenna horn right from the start.

By filling the resonant cavity 108 around the two fins with a dielectric suitable for microwaves, the mechanical design of the arrangement is reduced by the resulting (physical, wave) shortening factor, thus saving corresponding space on the chip and thus costs.

Integration on the chip eliminates the need for a connection line external to the chip between the chip and the double fin. This avoids reflections, which can improve the so-called ringing behavior of the radar module and save costs.

The use at high frequencies reduces the dimensions of the mechanical elements of the waveguide coupling or antenna coupling to such an extent that they can be integrated directly into the microwave chip.

The double fin may be built up like the other elements of the chip within the chip production process by arranging the copper and dielectric accordingly. Here, the space between the two fins can either be left in air or filled with dielectric. Which of the two options is preferred may depend on the type of antenna being fed into, for example, a dielectric conductor or an unfilled horn.

Figure 4:
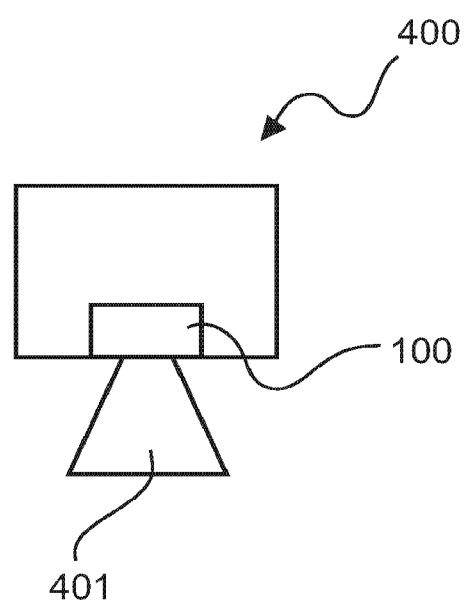
FIG. 4 shows a radar measuring device with a radar module described above and below.

FIG. 4 shows a radar measurement device 400 with a radar module 100 described above and a horn antenna 401 connected thereto.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar module configured for plant monitoring, comprising:
   a microwave chip comprising:
      a radar signal source configured to generate a radar signal having a frequency greater than 75 GHz,
      a metallic frame forming a cavity, and
      a coupler arranged inside the cavity formed by the metallic frame, the coupler having two fins made of metal and arranged opposite each other, wherein one of the two fins is connected to the radar signal source and the other one of the two fins is connected to the metallic frame.

2. The radar module according to claim 1, wherein the two fins are arranged to radiate a symmetrical radar signal.

3. The radar module according to claim 1, wherein the metallic frame encloses the two fins such that the frame protects the two fins from external mechanical impacts.

4. The radar module according to claim 1,
   wherein the two fins are surrounded by a cavity, and
   wherein the cavity is filled with a dielectric.

5. The radar module according to claim 1,
   wherein the two fins are surrounded by a cavity, and
   where the cavity is filled with atmospheric gas.

6. The radar module according to claim 1, wherein the coupler and the radar signal source are interconnected by means of a common substrate.

7. The radar module according to claim 1,
   further comprising a waveguide and/or an antenna,
   wherein the coupler is configured to couple the radar signal into the waveguide or antenna, and
   wherein the waveguide is configured to relay the coupled radar signal.

8. A radar measuring device, comprising a radar module according to claim 1.

9. The radar measuring device according to claim 8, wherein the radar module is configured for level measurement, level limit measurement, logistics automation, or manufacturing automation.

* * * * *